United States Patent
Xu et al.

(10) Patent No.: US 12,434,925 B2
(45) Date of Patent: Oct. 7, 2025

(54) POSITION DETECTION APPARATUS AND METHOD OF DISTRIBUTION OBJECT, ROBOT, DISTRIBUTION APPARATUS, AND CONTROLLER

(71) Applicant: JINGDONG TECHNOLOGY INFORMATION TECHNOLOGY CO., LTD, Beijing (CN)

(72) Inventors: Zhetao Xu, Beijing (CN); Jun Xiao, Beijing (CN)

(73) Assignee: JINGDONG TECHNOLOGY INFORMATION TECHNOLOGY CO., LTD, Beijing (CN)

( * ) Notice: Subject to any disclaimer, the term of this patent is extended or adjusted under 35 U.S.C. 154(b) by 894 days.

(21) Appl. No.: 17/639,156

(22) PCT Filed: Sep. 11, 2020

(86) PCT No.: PCT/CN2020/114906
§ 371 (c)(1),
(2) Date: Feb. 28, 2022

(87) PCT Pub. No.: WO2021/052264
PCT Pub. Date: Mar. 25, 2021

(65) Prior Publication Data
US 2022/0332526 A1 Oct. 20, 2022

(30) Foreign Application Priority Data
Sep. 18, 2019 (CN) .......................... 201910881295.0

(51) Int. Cl.
*B65G 63/00* (2006.01)
*B25J 9/16* (2006.01)
(Continued)

(52) U.S. Cl.
CPC ............ *B65G 63/00* (2013.01); *B25J 9/1694* (2013.01); *B66F 9/063* (2013.01); *B66F 9/0755* (2013.01); *G01B 11/0608* (2013.01); *G01C 3/02* (2013.01)

(58) Field of Classification Search
CPC ...... B65G 63/00; G01B 11/0608; G01C 3/02; B66F 9/063; B66F 9/0755; B66F 9/24; B25J 9/1694
(Continued)

(56) References Cited

U.S. PATENT DOCUMENTS 6,543,983 B1 * 4/2003 Felder .................. B23Q 7/1442
414/389
10,048,398 B2 * 8/2018 Rose .................... G05D 1/0225
(Continued)

FOREIGN PATENT DOCUMENTS

CN 106853640 A 6/2017
CN 207108377 U 3/2018
(Continued)

OTHER PUBLICATIONS

"International Search Report and Written Opinion of the International Searching Authority with English language translation", PCT International Application No. PCT/CN2020/114906, Nov. 27, 2020, 18 pp.
(Continued)

*Primary Examiner* — Daniel L Murphy
(74) *Attorney, Agent, or Firm* — Myers Bigel, P.A.

(57) ABSTRACT

The present disclosure relates to a position detection apparatus and a position detection method of a distribution object, a robot, a distribution apparatus, and a controller, and relates to the field of robots. The apparatus includes: a plurality of ranging sensors arranged on an end surface of a protrusion member of a robot facing a placement region of
(Continued)

the distribution object, wherein the protrusion member is located on a chassis of the robot and each of the plurality of ranging sensors is configured to detect a distance between the ranging sensor and an end surface of the distribution object facing the plurality of ranging sensors; and a controller configured to determine that the distribution object has been located at a predetermined position above the chassis in a case where the distance detected by each of the plurality of ranging sensors is not greater than a first distance threshold.

20 Claims, 5 Drawing Sheets

(51) Int. Cl.
  *B66F 9/06* (2006.01)
  *B66F 9/075* (2006.01)
  *G01B 11/06* (2006.01)
  *G01C 3/02* (2006.01)
(58) Field of Classification Search
  USPC ........................................................ 356/4.01
  See application file for complete search history.

(56) References Cited

U.S. PATENT DOCUMENTS

| | | | |
|---|---|---|---|
| 10,328,578 B2 * | 6/2019 | Holz | ..................... B66F 9/00 |
| 2007/0215412 A1 | 9/2007 | Fossier et al. | |
| 2017/0015537 A1 | 1/2017 | Bosworth et al. | |

FOREIGN PATENT DOCUMENTS

| | | |
|---|---|---|
| CN | 108046172 A | 5/2018 |
| CN | 108946586 A | 12/2018 |
| CN | 208292587 U | 12/2018 |
| CN | 109178759 A | 1/2019 |
| CN | 208327296 U | 1/2019 |
| CN | 109726962 A | 5/2019 |
| CN | 110589505 A | 12/2019 |
| EP | 3339238 A1 | 6/2018 |
| JP | H05208799 A | 8/1993 |
| JP | 2004126800 A | 4/2004 |
| KR | 20120070804 A | 7/2012 |

OTHER PUBLICATIONS

"Communication with Supplementary European Search Report", EP Application No. 20864806.3, Aug. 7, 2023, 10 pp.

* cited by examiner

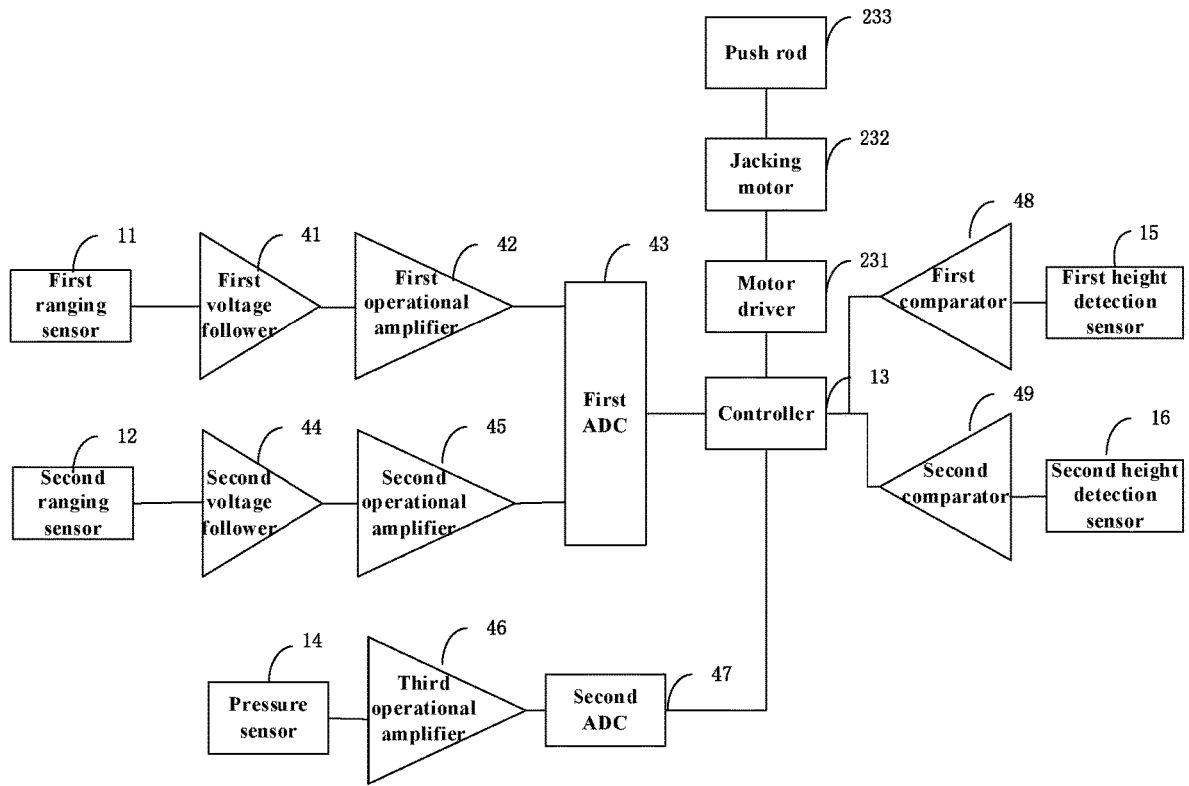

Fig. 4

510
A controller receives a distance between each of a plurality of ranging sensors and an end surface of a distribution object facing the plurality of ranging sensors from the each of the plurality of ranging sensors 520
The controller determines that the distribution object has been located at a predetermined position above the chassis in a case where the distance detected by each of the plurality of ranging sensors is not greater than a first distance threshold

Fig. 5

POSITION DETECTION APPARATUS AND METHOD OF DISTRIBUTION OBJECT, ROBOT, DISTRIBUTION APPARATUS, AND CONTROLLER

CROSS REFERENCE TO RELATED APPLICATIONS

The present disclosure is a U.S. National Stage Application under 35 U.S.C. § 371 of International Patent Application No. PCT/CN2020/114906, filed on Sep. 11, 2020, which is based on and claims priority of Chinese application for invention No. 201910881295.0 filed on Sep. 18, 2019 the disclosures of both of which are hereby incorporated into this disclosure by reference in its entirety.

TECHNICAL FIELD

The present disclosure relates to the field of robots, and in particular to a position detection apparatus and a position detection method of a distribution object, a robot, a distribution apparatus, and a controller.

BACKGROUND

At present, there are two kinds of design that are commonly adopted for hospital distribution robots, one is an integrated design including a distribution vehicle and a robot that cannot be separated from each other; the other is a detachable design including a distribution vehicle detachably connected to a robot. The detachable design can improve the use efficiency of distribution vehicles, and is more flexible since different distribution vehicles can be used for different objects.

In related technologies, a robot can travel to a place under a distribution vehicle, or a worker can push a distribution vehicle to a place above a robot, and then the robot can carry the distribution vehicle to move forward.

SUMMARY

According to an aspect of the present disclosure, a position detection apparatus of a distribution object is provided, comprising: a plurality of ranging sensors arranged on an end surface of a protrusion member of a robot facing a placement region of the distribution object, wherein the protrusion member is located on a chassis of the robot and each of the plurality of ranging sensors is configured to detect a distance between the each of the plurality of ranging sensors and an end surface of the distribution object facing the plurality of ranging sensors; and a controller configured to determine that the distribution object has been located at a predetermined position above the chassis in a case where the distance detected by each of the plurality of ranging sensors is not greater than a first distance threshold.

In some embodiments, projections of at least two of the plurality of ranging sensors on the chassis do not overlap each other.

In some embodiments, projections of the plurality of ranging sensors on the chassis do not overlap each other.

In some embodiments, a distance between projections of at least two of the plurality of ranging sensors on the chassis is not less than a second distance threshold.

In some embodiments, the controller is further configured to send an alarm instruction in a case of a change of at least one of the distances detected by the plurality of ranging sensors during an operation of the robot.

In some embodiments, the position detection apparatus further comprising: a pressure sensor arranged on a jacking mechanism of the robot, and configured to transmit information of a detected pressure on the jacking mechanism to the controller, wherein the controller is further configured to send an instruction to the jacking mechanism to stop lifting the distribution object in a case of determining that the detected pressure is greater than a pressure threshold.

In some embodiments, the controller is further configured to transmit an instruction to the jacking mechanism to lift the distribution object in a case where the distribution object has been already at the predetermined position above the chassis of the robot.

In some embodiments, the position detection apparatus further comprising: a first height detection sensor configured to send a first signal to the controller in a case of detecting that the jacking mechanism has risen to a predetermined height, wherein the controller is further configured to send an instruction to the jacking mechanism to stop lifting the distribution object in a case of receiving the first signal.

In some embodiments, the position detection apparatus further comprising: a second height detection sensor configured to send a second signal to the controller in a case of detecting that the jacking mechanism has lowered to an initial position thereof, wherein the controller is further configured to send an instruction to the jacking mechanism to stop lowering in a case of receiving the second signal.

In some embodiments, the first height detection sensor and the second height detection sensor are infrared pair diodes.

According to another aspect of the present disclosure, a robot is further proposed, comprising the position detection apparatus of the distribution object according to any one of the foregoing embodiments.

According to still another aspect of the present disclosure, a distribution apparatus is further provided, comprising: a robot according to any one of the foregoing embodiments; and a distribution vehicle, wherein, the distribution vehicle is detachably connected to the robot.

According to an aspect of the present disclosure, a position detection method of a distribution object is further provided, comprising: receiving, from each of a plurality of ranging sensors, a distance between the each of the plurality of ranging sensors and an end surface of the distribution object facing the plurality of ranging sensors, wherein the plurality of ranging sensors are arranged on an end surface of a protrusion member of a robot facing a placement region of the distribution object; and determining that the distribution object has been located at a predetermined position above the chassis in a case where the distance detected by each of the plurality of ranging sensors is not greater than a first distance threshold.

In some embodiments, the position detection method further comprising: sending an alarm instruction in a case of a change of at least one of the distances detected by the plurality of ranging sensors during an operation of the robot.

In some embodiments, the position detection method further comprising: receiving information of a pressure detected by a pressure sensor, wherein the information of the pressure is information of a pressure on the jacking mechanism of the robot; and sending an instruction to the jacking mechanism to stop lifting the distribution object in a case of determining that the pressure is greater than a pressure threshold.

In some embodiments, the position detection method further comprising: transmitting an instruction to the jacking mechanism to lift the distribution object in a case where the distribution object has been already at the predetermined position above the chassis of the robot.

In some embodiments, the position detection method further comprising: sending an instruction to the jacking mechanism to stop lifting the distribution object in a case of receiving a first signal sent from a first height sensor, wherein the first signal indicates that the jacking mechanism has risen to a predetermined height.

In some embodiments, the position detection method further comprising: sending an instruction to the jacking mechanism to stop lowering in a case of receiving a second signal sent from a second height sensor, wherein the second signal indicates that the jacking mechanism has lowered to an initial position thereof.

According to another aspect of the present disclosure, a controller is further provided, comprising: a processor; a memory coupled to the processor and storing instructions that when executed by the processor, cause the processor to execute the position detection method of the distribution object according to any one of foregoing embodiments.

According to still another aspect of the present disclosure, a non-transitory computer-readable storage medium is provided on which a computer program is stored, which when executed by a processor cause the processor to implement the steps of the position detection method of the distribution object according to any one of foregoing embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are included to provide a further understanding of the present disclosure and are incorporated in and constitute a part of this specification, illustrate embodiments of the invention, and together with the illustrative embodiments of the present application serve to explain the present disclosure, but are not limitation thereof. In the drawings:

FIG. 4 is a schematic structural diagram of the position detection apparatus of the distribution object according to still other embodiments of the present disclosure.

FIG. 5 is a flowchart of a position detection method of a distribution object according to some embodiments of the present disclosure.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors find that due to a low positioning accuracy of the robot or an operation error of the worker, there may be a situation where the distribution vehicle fails to be placed at a predetermined position above the robot, which may lead to a risk of the distribution vehicle disconnecting from the robot during transportation.

A technical problem to be solved by the present disclosure is to provide a position detection apparatus and a position detection method of a distribution object, a robot, a distribution apparatus and a controller, which can improve an accuracy of detecting whether a distribution object is located at the predetermined position above the robot.

The position detection apparatus of the distribution object of the present disclosure comprises: a plurality of ranging sensors arranged on an end surface of a protrusion member of a robot facing a placement region of a distribution object, wherein the protrusion member is located on a chassis of the robot and each of the plurality of ranging sensors is configured to detect a distance between the each of the plurality of ranging sensors and an end surface of the distribution object facing the plurality of ranging sensors; and a controller configured to determine that the distribution object has been located at a predetermined position above the chassis in a case where the distance detected by each of the plurality of ranging sensors is not greater than a first distance threshold. The plurality of ranging sensors represent at least two ranging sensors.

In some embodiments, projections of at least two of the plurality of ranging sensors on the chassis do not overlap each other.

In some embodiments, projections of the plurality of ranging sensors on the chassis do not overlap each other.

In some embodiments, a distance between projections of at least two of the plurality of ranging sensors on the chassis is not less than a second distance threshold. Furthermore, a distance between projections of any two of the plurality of ranging sensors on the chassis is not less than the second distance threshold.

In some embodiments, the controller is further configured to send an alarm instruction in a case of a change of at least one of the distances detected by the plurality of ranging sensors during an operation of the robot.

Figure 1:
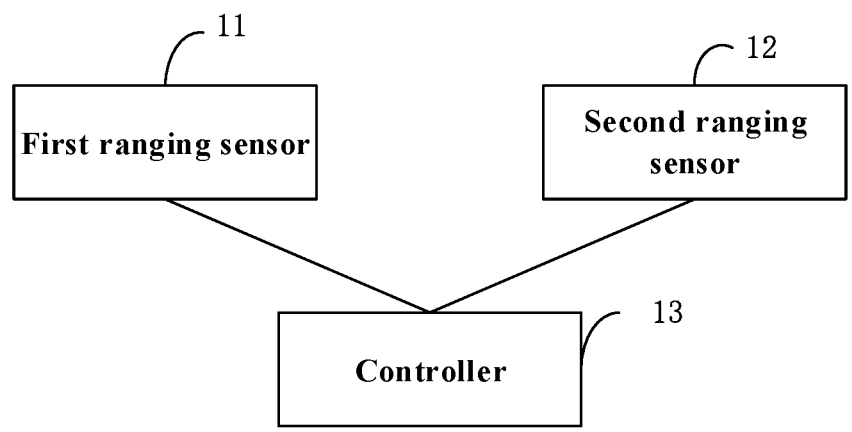
FIG. 1 is a schematic structural diagram of a position detection apparatus of a distribution object according to some embodiments of the present disclosure.

FIG. 1 is a structural diagram of a position detection apparatus of a distribution object according to some embodiments of the present disclosure. As shown in FIG. 1, only two of the plurality of ranging sensors, i.e., a first ranging sensor 11 and a second ranging sensor 12, and a controller 13, are displayed in this embodiment.

Figure 2:
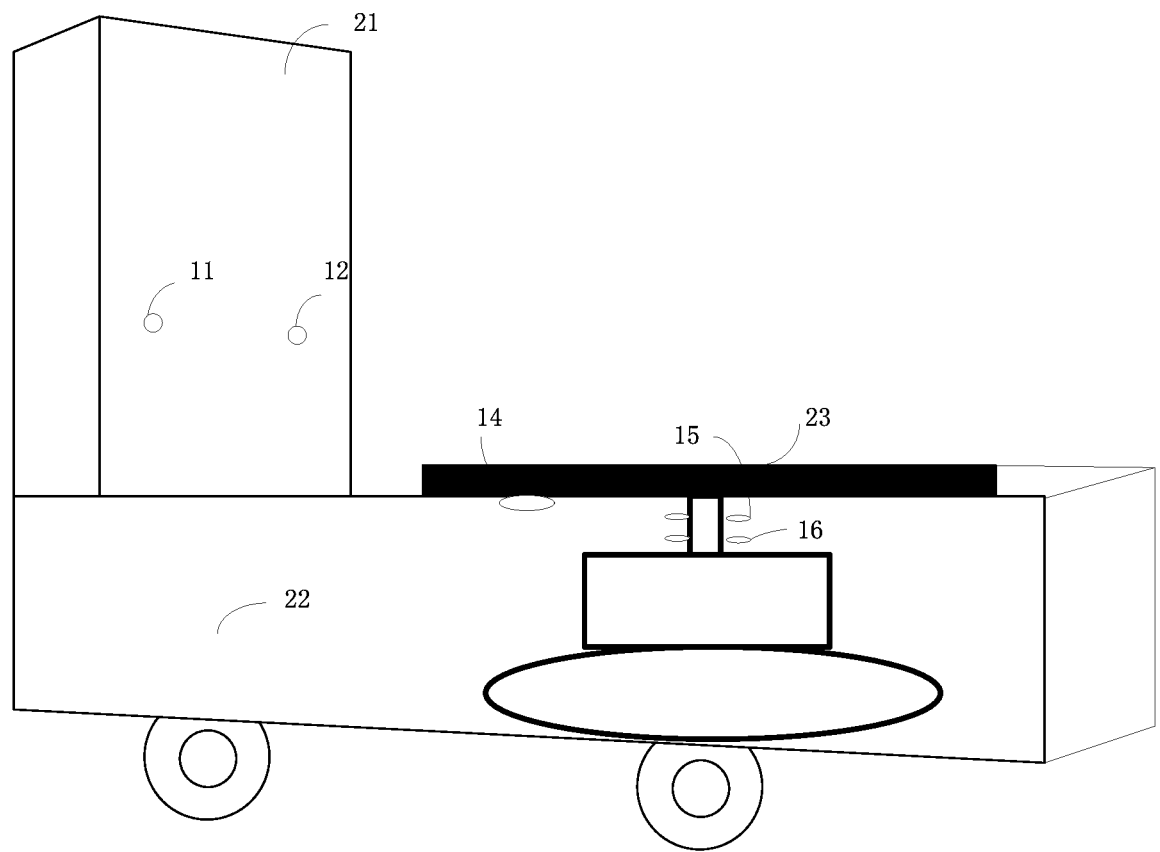
FIG. 2 is a schematic structural diagram of the position detection apparatus of the distribution object according to other embodiments of the present disclosure.
Figure 3:
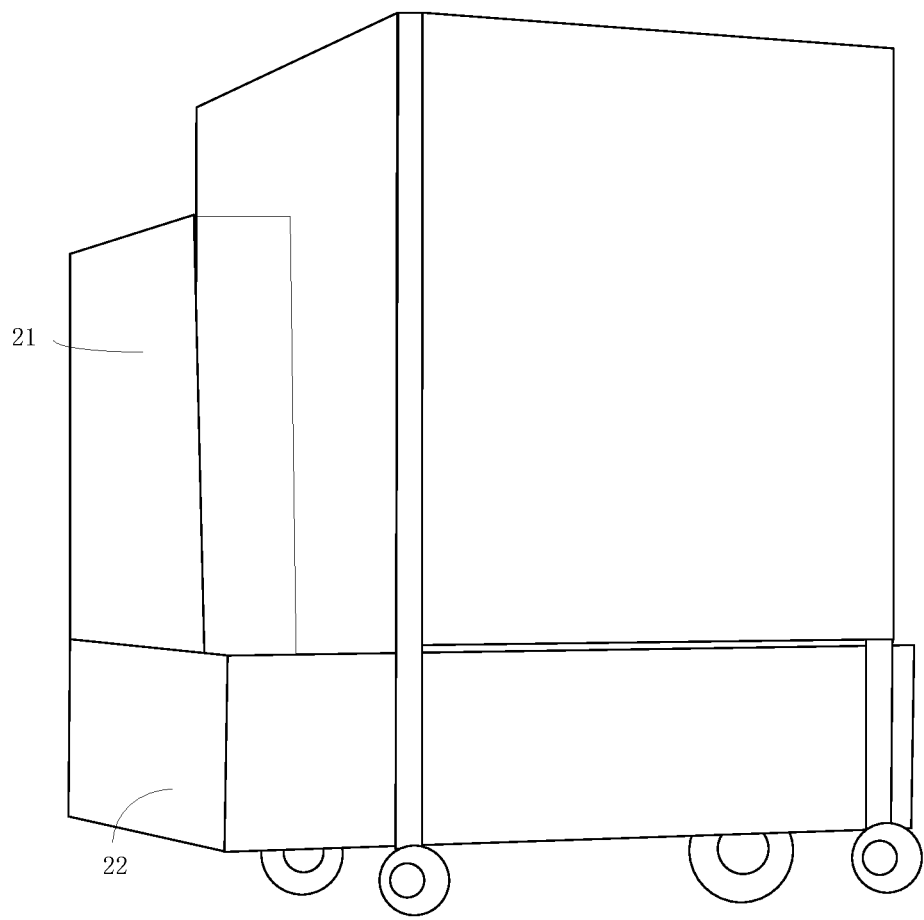
FIG. 3 is a schematic structural diagram of the position detection apparatus of the distribution object according to still other embodiments of the present disclosure.

As shown in FIGS. 2 and 3, the first ranging sensor 11 and the second ranging sensor 12 may be located on an end surface of a protrusion member 21 of a robot facing a placement region of a distribution object. The robot comprises, for example, the protrusion member 21 and a chassis 22, and the protrusion member 21 is arranged on the chassis 22. In some embodiments, the end surface of the protrusion member 21 facing the placement region of the distribution object is arranged perpendicular to the chassis 22. The protrusion member 21 may be arranged at a front or rear end of the chassis 22 in a travailing direction. The protrusion member 21 may be a head protruding relative to the chassis 22.

In some embodiments, the distribution object is, for example, a distribution vehicle. The distribution vehicle can be provided with legs and moving devices. For example, the moving devices are universal wheels.

In some embodiments, a projection of the first ranging sensor 11 on the chassis 22 does not overlap a projection of the second ranging sensor 12 on the chassis 22.

In some embodiments, a distance between the projection of the first ranging sensor 11 on the chassis 22 and the projection of the second ranging sensor 12 on the chassis 22 is not less than a second distance threshold. For example, the first ranging sensor 11 and the second ranging sensor 12 are respectively located on a left side and a right side of the end surface of the protrusion member 21 of the robot facing the placement region of the distribution object, which can monitor a distance and an angle between opposite end surfaces of the distribution object and the protrusion member in real time, so as to ensure that the opposite end surfaces of the distribution object and the distribution object are parallel to each other.

In some embodiments, each of the first ranging sensor 11 and the second ranging sensor 12 is configured to detect a distance between each of the first ranging sensor 11 and the second ranging sensor 12 and the end surface of the distribution object facing the plurality of ranging sensors, and transmits the detected distance to the controller 13. For example, the first distance sensor 11 transmits a detected first distance to the controller 13, and the second distance sensor 12 transmits a detected second distance to the controller 13.

In some embodiments, the first ranging sensor 11 and the second ranging sensor 12 are, for example, infrared ranging sensors. For example, a measuring range of each of the infrared ranging sensors is 1 to 100 cm. When there is an obstruction in front of the each of the infrared ranging sensors, the each of the infrared ranging sensors sensor will output a distance from the obstruction to the each of the infrared ranging sensors. As the end surface of the distribution vehicle facing the infrared sensors approaches the protrusion member 21 of the robot, the distance detected by the each of the infrared ranging sensors will gradually decrease with the proximity of the distribution vehicle.

In some embodiments, as shown in FIG. 4, the first ranging sensor 11 outputs the detected first distance in a form of an analog voltage. A driving capacity of the analog voltage output from the first ranging sensor 11 is increased through a first voltage follower 41. A voltage signal output by the first voltage follower 41 is input to a first operational amplifier 42, which amplifies the analog voltage carrying the first distance information, and inputs it to a first ADC (analog-to-digital converter) 43. The second ranging sensor 12 outputs the detected second distance in the form of an analog voltage. A driving capacity of the analog voltage output from the second ranging sensor 12 is increased through a second voltage follower 44. A voltage signal output by the second voltage follower 44 is input to a second operational amplifier 45, which amplifies the analog voltage carrying the second distance information, and inputs it to the first ADC 43. The first ADC 43 converts the analog voltages to digital values and inputs them to the controller 13 through a SPI (Serial Peripheral Interface).

The controller 13 is configured to determine whether the distribution object has been located at a predetermined position above the chassis 22 of the robot according to the distance detected by each of the plurality of ranging sensors.

For example, the controller 13 is configured to determine that the distribution object has been located at a predetermined position above the chassis 22 in a case of determining that the first distance detected by the first ranging sensor 11 is not greater than a first distance threshold and the second distance detected by the second ranging sensor 12 is not greater than the first distance threshold.

For example, if the first distance and the second distance detected by the first ranging sensor 11 and the second ranging sensor 12 are both not greater than 4 cm, it indicates that the distribution object has been located at a predetermined position above the chassis 22. If the distance detected by the first ranging sensor 11 is 10 cm and the distance detected by the second ranging sensor 12 is 4 cm, it indicates that the distribution object is inclined or there is interference, and an adjustment should be made in time to place the distribution object to the predetermined position above the chassis 22.

In some embodiments, if the distribution object has been already at the predetermined position above the chassis 22 of the robot, the controller 13 transmits an instruction to the jacking mechanism 23 to lift the distribution object. For example, the controller 13 transmits an instruction to a motor driver 231 of the jacking mechanism 23 to control a jacking motor 232 to rotate, so that a push rod 233 of the jacking mechanism is pushed upward to lift the distribution object off the ground.

In the above embodiment, the plurality of ranging sensors are arranged on the end surface of the protrusion member of the robot facing the distribution object; each of the plurality of ranging sensors detects the distance between the each of the plurality of ranging sensors and the end surface of the distribution object facing the plurality of ranging sensors; and whether the distribution object is located at a predetermined position above the chassis of the robot according to the distance detected by the each of the plurality of ranging sensors is determined. The position detection apparatus of the distribution object of the embodiment of the present disclosure can improve an accuracy of detecting whether the distribution object is located at the predetermined position above the robot, thereby reducing a loss in a transportation process.

In another embodiment of the present disclosure, when the robot transports the distribution object along a preset path, the first ranging sensor 11 and the second ranging sensor 12 respectively transmit the detected first distance and the second distance to the controller 13 in real time. If the first distance or the second distance changes, it indicates that the distribution object is at risk of shaking or falling off, and the controller 13 can transmit an alarm signal in time, thereby reducing the loss caused by falling off of the distribution object.

In other embodiments of the present disclosure, the position detection apparatus of the distribution object further comprises a pressure sensor 14 arranged on the jacking mechanism 23 and configured to transmit information of a detected pressure on the jacking mechanism 23 to the controller 13; the controller 13 is further configured to send an instruction to the jacking mechanism 23 to stop lifting the distribution object in a case of determining that the detected pressure is greater than a pressure threshold.

For example, during a lifting process of the jacking mechanism 23, the pressure sensor 14 located on the jacking mechanism 23 outputs a value of a detected pressure on the jacking mechanism in the form of an analog voltage signal.

The analog voltage signal is input to the controller 13 through a third operational amplifier 46 and a second ADC 47. The controller 13 resolves the value of the detected pressure on the jacking mechanism. If the distribution object is overweight, the controller 13 sends an instruction to the motor driver 231 of the jacking mechanism 23 to control the jacking motor 232 to stop operation and give an alarm to a master computer.

In the above embodiment, if the distribution object is overweight, the movement of the jacking mechanism is stopped to prevent overload, thereby reducing a probability of danger during a transportation.

In other embodiments of the present disclosure, the position detection apparatus of the distribution object further comprises: a first height detection sensor 15 configured to send a first signal to the controller 13 in a case of detecting that the jacking mechanism 23 has risen to a predetermined height; the controller 13 is further configured to send an instruction to the jacking mechanism 23 to stop lifting the distribution object in a case of receiving the first signal. For example, when the distribution object is within a load-bearing range of the robot and the robot gradually lifts the distribution object, the first height detection sensor 15 mounted in the jacking mechanism is triggered to send a switch signal at a certain moment. Through a comparison by a first comparator 48, the switch signal is input to the controller 13. The controller 13 realizes that the push rod 233 has risen to a preset position, and sends an instruction to the motor driver 231 to control the jacking motor 232 to stop operation.

In other embodiments, the position detection apparatus of the distribution object further comprises: a second height detection sensor 16 configured to send a second signal to the controller 13 in a case of detecting that the jacking mechanism 23 has lowered to an initial position thereof; the controller 13 is further configured to send an instruction to the jacking mechanism 23 to stop lowering in a case of receiving the second signal. For example, after the robot reaches its destination, the controller 13 sends an instruction to the motor driver 231 to control the jacking motor 232 to operate to lower the push rod 233. When the push rod 233 triggers the second height detection sensor 16 at the initial position to output a signal, the signal after a comparison by a second comparator 49, is input to the controller 13. The controller 13 then realizes that the push rod 233 has lowered to the initial position, and sends an instruction to the motor driver 231 to control the jacking motor 232 to stop operation.

In some embodiments, each of the first height detection sensor 15 and the second height detection sensor 16 is an infrared pair diode. A infrared pair diode comprises a light-emitting diode and a photodiode. Measurement data is output when there is a barrier between the light-emitting diode and the photodiode. For example, a blank may be disposed on the push rod, and the infrared pair diode is arranged on both sides of the blank. When the blank moves to the position of the infrared pair diode, the infrared pair diode can output measurement data.

In the above embodiment, through providing the first height detection sensor and the second height detection sensor, the jacking mechanism can be prevented from raising too high and lowering too much.

In other embodiments of the present disclosure, a robot is provided, comprising the position detection apparatus of the distribution object described above.

In other embodiments of the present disclosure, a distribution apparatus is provided, comprising the robot described above and a distribution object, wherein the distribution object is detachably connected to the robot. In some embodiments, the distribution object is, for example, a distribution vehicle.

The distribution apparatus is applicable in hospitals and other places. During a process of the robot carrying the distribution vehicle, the position of the distribution vehicle can be detected to ensure that the distribution vehicle is located in an appropriate position relative to the robot. In addition, during the transportation, the status of the distribution vehicle is monitored in real time to ensure that an alarm can be sent in time when the distribution vehicle encounters the risk of falling off from the robot, so as to reduce the loss.

FIG. 5 is a structural diagram of a position detection method of a distribution object according to some embodiments of the present disclosure.

In step 510, a controller receives a distance between each of a plurality of ranging sensors and an end surface of a distribution object facing the plurality of ranging sensors from the each of the plurality of ranging sensors, wherein the plurality of ranging sensors are arranged on an end surface of a protrusion member of a robot facing a placement region of the distribution object.

In step 520, the controller determines that the distribution object has been located at a predetermined position above the chassis in a case where the distance detected by each of the plurality of ranging sensors is not greater than a first distance threshold.

In the above embodiment, the plurality of ranging sensors are arranged on the end surface of the protrusion member of the robot facing the distribution object; each of the plurality of ranging sensors detects the distance between the each of the plurality of ranging sensors and the end surface of the distribution object facing the plurality of ranging sensors; and whether the distribution object is located at a predetermined position above the chassis of the robot according to the distance detected by the each of the plurality of ranging sensors is determined. The position detection apparatus of the distribution object of the embodiment of the present disclosure can improve an accuracy of detecting whether the distribution object is located at the predetermined position above the robot, thereby reducing a loss in a transportation process.

Figure 6:
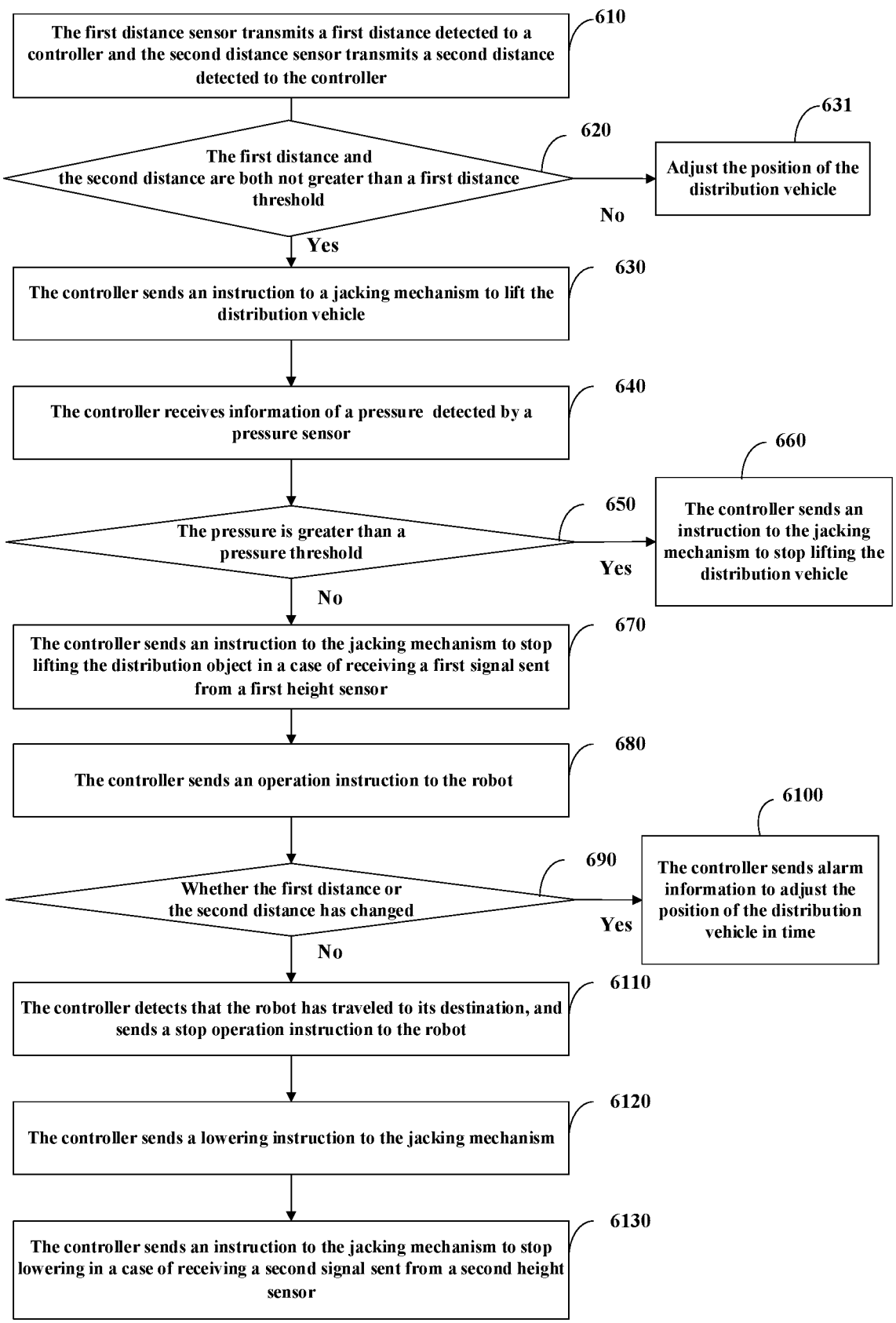
FIG. 6 is a flowchart of the position detection method of the distribution object according to other embodiments of the present disclosure.

As shown in FIG. 6, taking a situation in which the plurality of ranging sensors comprise a first ranging sensor and a second ranging sensor, and a robot is engaged in transporting a distribution vehicle as an example, the scheme of the present disclosure will be described below.

In step 610, the first distance sensor transmits a first distance detected between the first ranging sensor and an end surface of a distribution object facing the first ranging sensor to a controller, and the second distance sensor transmits a second distance detected between the second ranging sensor and an end surface of a distribution object facing the second ranging sensor to the controller.

In step 620, the controller determines whether the first distance and the second distance are not greater than a first distance threshold; if so, step 630 is executed; otherwise, step 631 is executed.

In step 630, the controller sends an instruction to a jacking mechanism to lift the distribution vehicle. At this point, the distribution vehicle has been already at a predetermined position above the chassis of the robot.

In step 631, the position of the distribution vehicle is adjusted.

In step 640, the controller receives information of a pressure detected by a pressure sensor.

In step 650, the controller determines whether the pressure is greater than a pressure threshold; if so, step 660 is executed; otherwise, step 670 is executed.

In step 660, the controller sends an instruction to the jacking mechanism to stop lifting the distribution vehicle.

In step 670, the controller sends an instruction to the jacking mechanism to stop lifting the distribution object in a case of receiving a first signal sent from a first height sensor; wherein the first height detection sensor sends a first signal to the controller in a case of detecting that the jacking mechanism has risen to a predetermined height.

In step 680, the controller sends an operation instruction to the robot. The robot transports the distribution vehicle along a preset path.

In step 690, the controller determines whether the first distance or the second distance has changed in real time; if so, step 6100 is executed; otherwise, step 690 is executed.

In step 6100, the controller sends alarm information to adjust the position of the distribution vehicle in time.

In step 6110, the controller detects that the robot has traveled to its destination, and sends a stop operation instruction to the robot.

In step 6120, the controller sends a lowering instruction to the jacking mechanism.

In step 6130, the controller sends an instruction to the jacking mechanism to stop lowering in a case of receiving a second signal sent from a second height sensor; wherein the second height detection sensor sends the second signal to the controller in a case of detecting that the jacking mechanism has lowered to an initial position thereof. At this point, the jacking mechanism stops moving.

In the embodiments, the plurality of sensors on the robot detect the position of the distribution vehicle relative to the robot in real time. Upon ensuring that the distribution vehicle has been accurately located at the predetermined position relative to the robot, the distribution vehicle is lifted and transported to the destination. Because the vehicle state can be monitored in real time, the risk of falling off of the distribution vehicle during transportation can be reduced.

Figure 7:
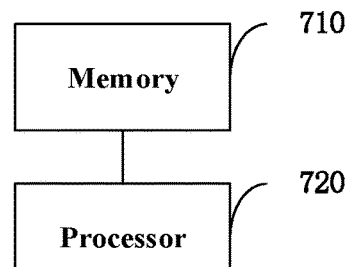
FIG. 7 is a schematic structural diagram of a controller according to some embodiments of the present disclosure.

FIG. 7 is a schematic structural diagram of a controller according to some embodiments of the present disclosure. The controller comprises: a memory 710 and a processor 720, wherein the memory 710 may be a magnetic disk, flash memory or any other non-volatile storage medium. The memory is used to store instructions of corresponding embodiments shown in FIGS. 5 and 6. The processor 720 is coupled to memory 710 and may be implemented as one or more integrated circuits, such as a microprocessor or microcontroller. The processor 720 is used to execute the instructions stored in the memory.

Figure 8:
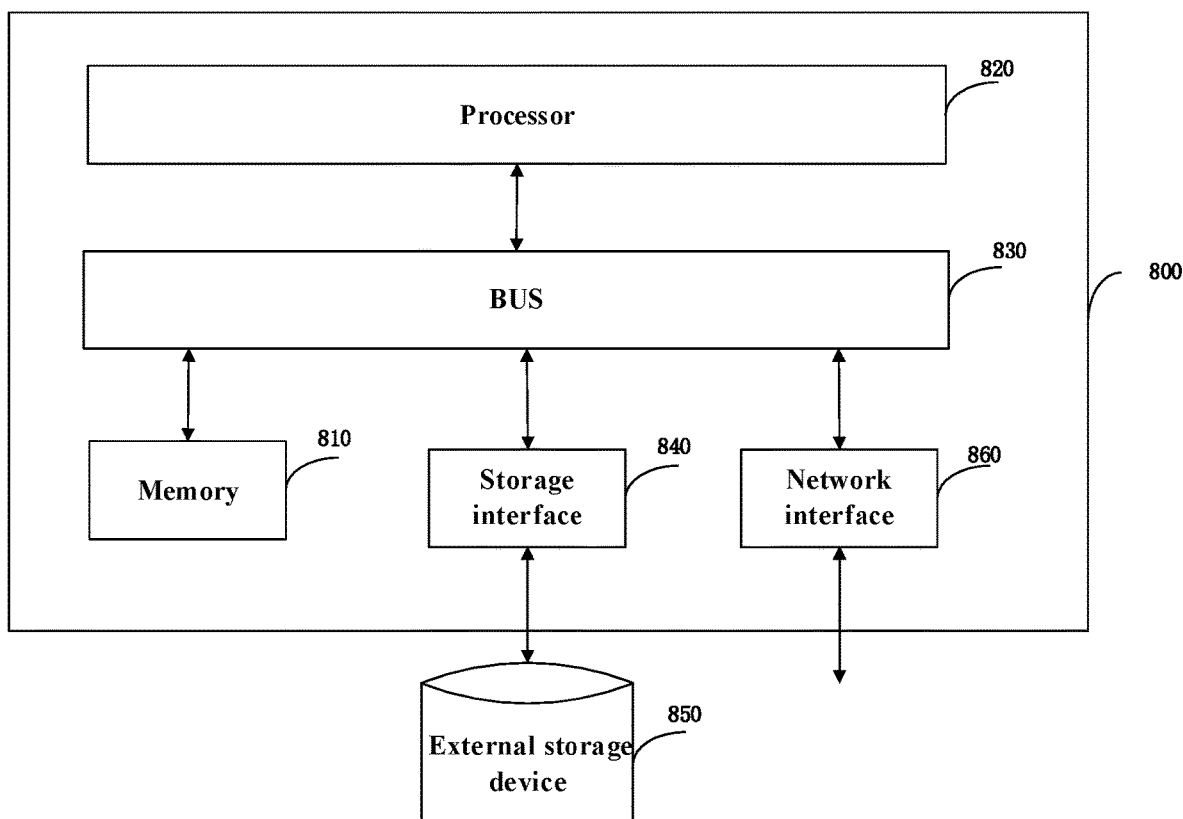
FIG. 8 is a schematic structural diagram of a controller according to other embodiments of the present disclosure.

In some embodiments, as illustrated in FIG. 8, the controller 800 includes a memory 810 and a processor 820. The processor 820 is coupled to the memory 810 via a bus 830. The controller 800 may be further connected to an external storage device 850 through a storage interface 840 to access external data, and may be further connected to a network or another computer system (not shown) through a network interface 860, which will not be described in detail herein.

In this embodiment, through storing data instructions in the memory and executing the above instructions by a processor, an accuracy of detecting whether the distribution object is located at a predetermined position above the robot can be improved, thereby reducing a loss in a transportation process.

In other embodiments, a computer-readable storage medium is provided, with computer program instructions stored thereon that, when executed by a processor, implement the steps of the methods of corresponding embodiments shown in FIGS. 5 and 6. Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an object of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams. The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A position detection apparatus of a distribution object, comprising:
   a plurality of ranging sensors arranged on an end surface of a protrusion member of a robot facing a placement region of the distribution object, wherein the protrusion member is located on a chassis of the robot, the protrusion member is a head protruding relative to the chassis, each of the plurality of ranging sensors is configured to detect a distance between the each of the plurality of ranging sensors and an end surface of the distribution object facing the plurality of ranging sensors, and projections of at least two of the plurality of ranging sensors on the chassis do not overlap each other; and a controller configured to determine that the distribution object has been located at a predetermined position above the chassis in a case where the distance detected by each of the plurality of ranging sensors is not greater than a first distance threshold, monitor a distance between opposite end surfaces of the distribution object and the protrusion member in real time and send an alarm instruction in a case of a change of at least one of the distances detected by the plurality of ranging sensors during an operation of the robot.

2. The position detection apparatus of the distribution object according to claim 1, wherein projections of the plurality of ranging sensors on the chassis do not overlap each other.

3. The position detection apparatus of the distribution object according to claim 1, wherein a distance between projections of at least two of the plurality of ranging sensors on the chassis is not less than a second distance threshold.

4. The position detection apparatus of the distribution object according to claim 1, further comprising:
a pressure sensor arranged on a jacking mechanism of the robot, and configured to transmit information of a detected pressure on the jacking mechanism to the controller,
wherein the controller is further configured to send an instruction to the jacking mechanism to stop lifting the distribution object in a case of determining that the detected pressure is greater than a pressure threshold.

5. The position detection apparatus of the distribution object according to claim 4, wherein the controller is further configured to transmit an instruction to the jacking mechanism to lift the distribution object in a case where the distribution object has been already at the predetermined position above the chassis of the robot.

6. The position detection apparatus of the distribution object according to claim 5, further comprising:
a first height detection sensor configured to send a first signal to the controller in a case of detecting that the jacking mechanism has risen to a predetermined height,
wherein the controller is further configured to send an instruction to the jacking mechanism to stop lifting the distribution object in a case of receiving the first signal.

7. The position detection apparatus of the distribution object according to claim 6, further comprising:
a second height detection sensor configured to send a second signal to the controller in a case of detecting that the jacking mechanism has lowered to an initial position thereof,
wherein the controller is further configured to send an instruction to the jacking mechanism to stop lowering in a case of receiving the second signal.

8. The position detection apparatus of the distribution object according to claim 7, wherein the first height detection sensor and the second height detection sensor are infrared pair diodes.

9. A robot, comprising the position detection apparatus of the distribution object according to claim 1.

10. A distribution apparatus, comprising:
the robot according to claim 9; and
a distribution vehicle, wherein the distribution vehicle is detachably connected to the robot.

11. A position detection method of a distribution object, comprising:

receiving, from each of a plurality of ranging sensors, a distance between the each of the plurality of ranging sensors and an end surface of the distribution object facing the plurality of ranging sensors, wherein the plurality of ranging sensors are arranged on an end surface of a protrusion member of a robot facing a placement region of the distribution object, the protrusion member is located on a chassis of the robot, the protrusion member is a head protruding relative to the chassis, and projections of at least two of the plurality of ranging sensors on the chassis do not overlap each other;

determining that the distribution object has been located at a predetermined position above the chassis in a case where the distance detected by each of the plurality of ranging sensors is not greater than a first distance threshold; and monitoring a distance between opposite end surfaces of the distribution object and the protrusion member in real time and sending an alarm instruction in a case of a change of at least one of the distances detected by the plurality of ranging sensors during an operation of the robot.

12. The position detection method of the distribution object according to claim 11, further comprising:
receiving information of a pressure detected by a pressure sensor, wherein the information of the pressure is information of a pressure on the jacking mechanism of the robot; and
sending an instruction to the jacking mechanism to stop lifting the distribution object in a case of determining that the pressure is greater than a pressure threshold.

13. The position detection method of the distribution object according to claim 12, further comprising:
transmitting an instruction to the jacking mechanism to lift the distribution object in a case where the distribution object has been already at the predetermined position above the chassis of the robot.

14. The position detection method of the distribution object according to claim 13, further comprising:
sending an instruction to the jacking mechanism to stop lifting the distribution object in a case of receiving a first signal sent from a first height sensor,
wherein the first signal indicates that the jacking mechanism has risen to a predetermined height.

15. The position detection method of the distribution object according to claim 14, further comprising:
sending an instruction to the jacking mechanism to stop lowering in a case of receiving a second signal sent from a second height sensor,
wherein the second signal indicates that the jacking mechanism has lowered to an initial position thereof.

16. A controller, comprising:
a processor; and
a memory coupled to the processor and storing instructions that when executed by the processor, cause the processor to execute the position detection method of the distribution object according to claim 11.

17. The controller according to claim 16, wherein the instructions when executed by the processor, further cause the processor to:
receive information of a pressure detected by a pressure sensor, wherein the information of the pressure is information of a pressure on the jacking mechanism of the robot; and send an instruction to the jacking mechanism to stop lifting the distribution object in a case of determining that the pressure is greater than a pressure threshold.

18. The controller according to claim 17, wherein the instructions when executed by the processor, further cause the processor to:

transmit an instruction to the jacking mechanism to lift the distribution object in a case where the distribution object has been already at the predetermined position above the chassis of the robot.

19. The controller according to claim 17, wherein the instructions when executed by the processor, further cause the processor to:

send an instruction to the jacking mechanism to stop lifting the distribution object in a case of receiving a first signal sent from a first height sensor, wherein the first signal indicates that the jacking mechanism has risen to a predetermined height.

20. A non-transitory computer-readable storage medium storing computer programs, when executed by a processor, cause the processor to implement the position detection method of the distribution object according to claim 11.

* * * * *